(12) United States Patent
Yuhki et al.

(10) Patent No.: US 6,971,713 B2
(45) Date of Patent: Dec. 6, 2005

(54) ARMREST ARRANGEMENT IN AUTOMOTIVE SEAT

(75) Inventors: Kazumasa Yuhki, Tokyo (JP); Hisashi Nanai, Tokyo (JP); Mami Nishiyama, Tokyo (JP)

(73) Assignee: Tachi-S Co., Ltd., Tokyo (JP)

( * ) Notice: Subject to any disclaimer, the term of this patent is extended or adjusted under 35 U.S.C. 154(b) by 0 days.

(21) Appl. No.: 10/732,231

(22) Filed: Dec. 11, 2003

(65) Prior Publication Data

US 2004/0140697 A1    Jul. 22, 2004

(51) Int. Cl.[7] .............................................. B60N 2/46
(52) U.S. Cl. .................................................... 297/113
(58) Field of Search ........................ 297/112, 113, 115, 297/411.32

(56) References Cited

U.S. PATENT DOCUMENTS

| | | | | |
|---|---|---|---|---|
| 1,896,477 A | * | 2/1933 | Boller | 297/383 |
| 2,278,749 A | * | 4/1942 | Todd | 297/113 |
| 2,710,049 A | * | 6/1955 | Potocnik | 297/113 |
| 2,917,107 A | * | 12/1959 | Bloom et al. | 297/113 |
| 5,076,645 A | * | 12/1991 | Yokota | 297/411.32 |
| 5,096,256 A | * | 3/1992 | Mouri | 297/113 |
| 6,213,546 B1 | * | 4/2001 | Malusev et al. | 297/113 |

FOREIGN PATENT DOCUMENTS

JP    2001-211964    8/2001

* cited by examiner

*Primary Examiner*—Peter R. Brown
(74) *Attorney, Agent, or Firm*—Browdy and Neimark, PLLC

(57) ABSTRACT

An armrest arrangement in an automotive seat is provided to makes rotation of an armrest smooth and moderate. According thereto, an armrest is rotatably mounted in a storage portion formed in a seat back of the seat so as to be displaceable between a storage position at that storage portion and a use position, and an elastic band element is provided between the armrest and the seat back in order to resiliently bias the armrest in a direction to the storage portion. A covering element may be provided to cover such elastic band element to thereby prevent it from being viewed outwardly.

4 Claims, 2 Drawing Sheets

ARMREST ARRANGEMENT IN AUTOMOTIVE SEAT

BACKGROUND OF THE INVENTION

1. Field of the Invention

The present invention relates to an armrest in automotive seat. In particular, the invention is directed to an arrangement for rotatably securing the armrest in a seat back of an automotive rear seat.

2. Description of Prior Art

Various kinds of armrests are provided in automotive seats. In the case of armrest mounted in a seat back of an automotive rear seat, the hitherto normal arrangement of the armrest is such that a recessed storage portion is defined in the seat back of rear seat and the armrest itself is pivotally mounted in the recessed storage portion so as to be rotatable thereinto and away therefrom. According thereto, the armrest, when in no use, is normally stored in the recessed storage portion, and a user who wishes to use the armrest can easily draw and rotate the armrest from the recessed storage portion to a substantially horizontal use position.

However, the foregoing conventional armrest arrangement has been with the problem that, when a user draws the armrest from the storage portion, the armrest is abruptly rotated downwards to the use position with a slam, hence degrading the quality and operation of armrest. In attempt to solve such problem, it has been proposed that the recessed storage portion be narrowed in width relative to the armrest to create a frictional force therebetween to moderate the downward rotation of the armrest, which however requires an undesired force on the user's side to draw the armrest and impairs a smooth operation of the armrest. Also, it has been proposed to provide a damper mechanism workable to give a certain counter force against the direction in which the armrest is rotated downwardly from the storage portion, thereby resiliently weakening the downward rotation of armrest. But, such damper mechanism is quite complicated in structure and therefore increases costs involved.

SUMMARY OF THE INVENTION

In view of the above-stated drawbacks, it is therefore a primary purpose of the present invention to provide an improved armrest arrangement in a seat back of automotive seat, which is simplified structurally and allows an armrest not only to be rotatable with a small force required on the user's side, but also to be moderately rotatable without being subjected to any abrupt rotation.

In order to achieve such purpose, the armrest arrangement in a seat back of automotive seat in accordance with the present invention is basically comprised of:

- a storage portion defined in the seat back, the storage portion being adapted for allowing the armrest to be stored therein;
- an armrest rotatably mounted in the storage portion so as to be displaceable between a storage position where the armrest is stored in the storage portion when in no use and a use position where the armrest is located away from the storage position for use purpose; and
- an elastic means for resiliently biasing the armrest in a direction to the storage portion, the elastic means being provided between the armrest and seat back.

Accordingly, when a user rotates the armrest from the use position to the storage position, a resilient contacting force of the elastic means works to accelerate the rotation of armrest, so that the user can easily rotate the armrest with his or her small force toward the storage portion. Conversely, when the user draws and rotates the armrest from the storage portion, an increased contacting force of the elastic means effectively works to suppress an accelerated rotation of armrest the arms toward the use position, thereby insuring a moderate rotation of the armrest to that use position, which prevents undesired abrupt or quick rotation of the armrest.

Preferably, three may be provided a means for covering and preventing the elastic means from being viewed from the storage portion when the armrest is located in the use position.

Preferably, the elastic means may comprise an elastic contractible/extendible element of a band shape.

Other various features and advantages will become apparent from reading of the descriptions hereinafter, with reference to the drawings.

DETAILED DESCRIPTION OF PREFERRED EMBODIMENT OF THE INVENTION

Referring to FIGS. 1 to 4, there is illustrated one preferred mode of arrangement for rotatably securing an armrest in a seat back in accordance with the present invention, which is generally designated by (1).

Figure 1:
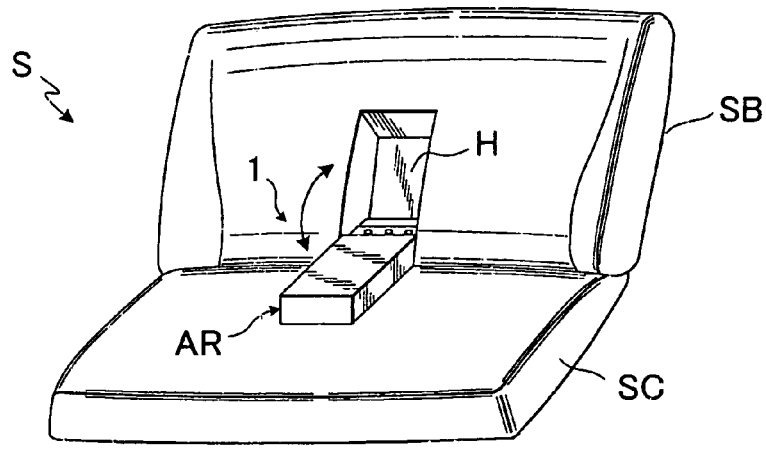
FIG. 1 is a schematic perspective view of an automotive seat to which the armrest arrangement of the present invention is applied.

FIG. 1 shows a rear seat (S) of bench seat type for use in an automobile (not shown), which comprises a seat back (SB) and a seat cushion (SC). Designation (AR) denotes an armrest rotatably provided to the seat back (SB). The seat back (SB) is formed with a recessed storage portion (H) in which the armrest (AR) may be stored when in no use.

Figure 2:
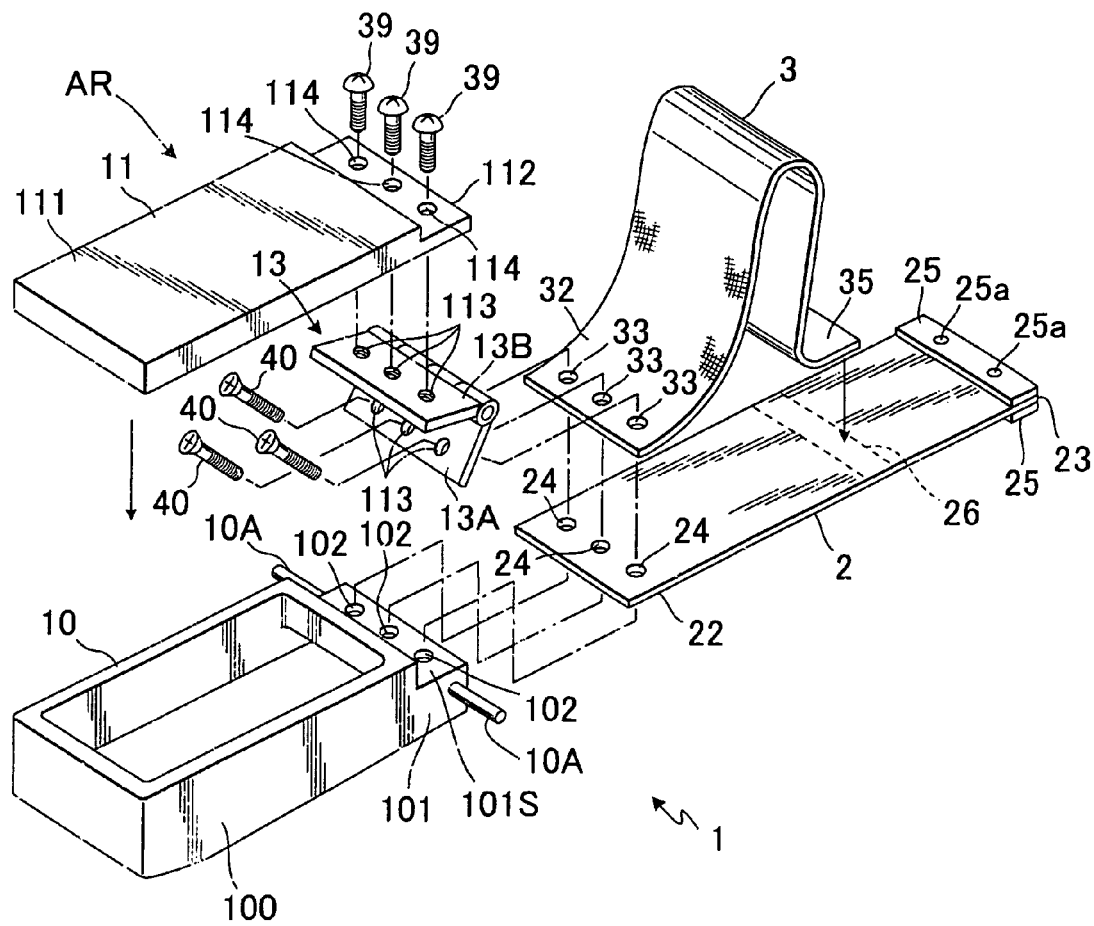
FIG. 2 is an exploded perspective view of a principal part in the armrest arrangement of the present invention.

As shown in FIG. 2, the armrest (AR) itself comprises an upper cover portion (11) and a lower body portion (10). The upper cover portion (11) is formed by a main region (111) of a rectangular plate configuration and a securing flange region (112) defined in one end of the main regions (111), the securing flange region (112) having three threaded holes (114) (114) (114) formed therein. On the other hand, the lower body portion (10) is formed by a three-dimensional main region (100) and a securing region (101) which is smaller in height-wise thickness than the main region (100), thus defining a recession (101S) between the main and securing regions (100) (101). Three through-holes (102) (102) (102) are formed in the upper wall of the securing region (101).

A support shaft (10A) is fixed in the securing region (101) of the armrest lower body portion (10). As shown, the support shaft (10A) penetrates through the securing region (101) and has two end portions project outwardly on the opposite sides of the latter.

Designation (13) denotes a hinge member having a first connecting flange (13A) and a second connecting flange (13B), both of which are rotatably connected together. Each of the first and second connecting flanges (13A) (13B) is formed with three through-holes (113) (113) (113). The first connecting flange (13A) is adapted for connection with the securing flange region (112) of upper cover portion (11), while on the other hand, the second connecting flange (13B) is adapted for connection with the securing region (101) of armrest lower body portion (10). Thus, with regard to the armrest (AR), the upper cover potion (11) thereof is hingedly connected with the lower body portion (10) thereof via the hinge member (13), so that the upper cover portion (11) is movable vertically toward and away from the lower body portion (10), as will be describe later.

Designations (2) and (3) denote an elastic contractible/extendible element and a cover material, respectively.

The illustrated elastic contractible/extendible element (2) is a rubber band material that is resiliently extendable and contractible. As shown, the rubber band material (2) has one end formed with three through-holes (24) (24) (24) and another end provided with a pair of securing plates (25) (25).

The illustrated cover material (3) is a cover cloth of an oblong shape having a width generally equal to the rubber band material (2). One end portion of the cover cloth (3) is formed with three through-holes (33) (33) (33), as shown.

It is noted that all the aforementioned threaded holes (113) and through-holes (114, 113, 33, 24 and 102) are disposed in a coaxially aligned relation with one another.

In assembly, as understandable from FIG. 2, the first connecting flange (13B) of hinge member (13), one end portion (32) of cover cloth (3) and one end portion (22) of rubber band material (2) are stacked in this order upon the upper wall of the securing region (101) of armrest lower body portion (10), so that all the associated through-holes (113, 33 and 24) are aligned with one another. Then, the three securing screws (40) are inserted through those aligned through-holes (113, 33, 24) and securely engaged with the respective three nuts (not designated), as can be seen from FIG. 3. Hence, the cover cloth (3) and rubber band material (2) are firmly connected with the armrest lower body portion (10).

Thereafter, the second connecting flange (13B) of hinge member (13) is securely attached to the securing flange region (112) of the armrest upper cover potion (11) by inserting the three securing screws (39) through the respective three through-holes (114) and driving them securely in the respective three threaded holes (113). Accordingly, the armrest upper cover potion (11) is rotatably connected with the armrest lower body portion (10).

As indicated in FIG. 2, another end portion (35) of the cover cloth (3) is fixedly attached to a predetermined location (26) on the rubber band material (2) as by adhesive.

Figure 3:
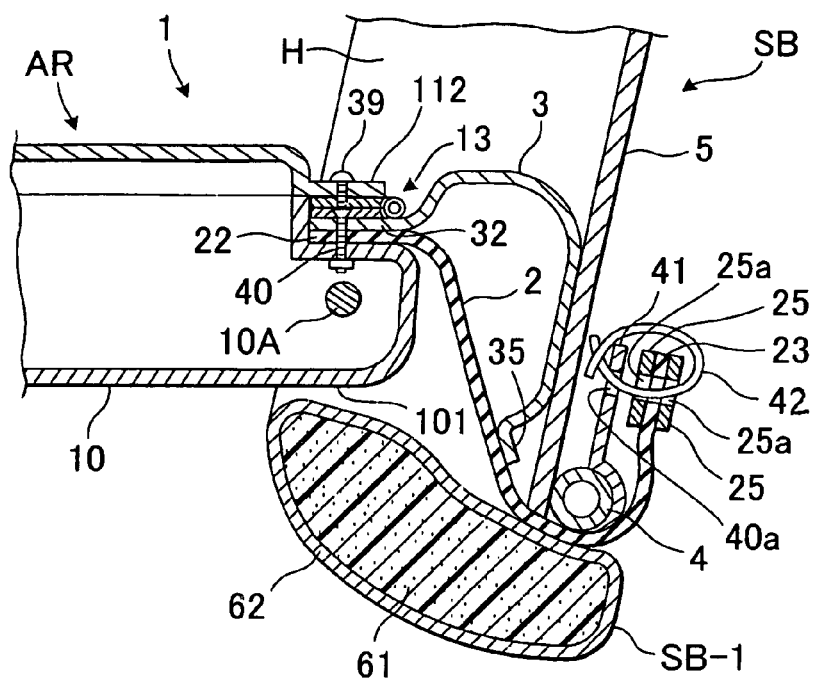
FIG. 3 is a fragmentary sectional view of the principal part of the invention, which shows the state where an armrest is located in a horizontal use position.

As shown in FIG. 3, the thus-formed armrest assembly is rotatably mounted in the recessed storage portion (H) of the seat back (SB) by connecting the two ends of the support shaft (10A) with a bracket (not shown) provided in the seat back (SB). In this regard, prior to such mounting of armrest assembly, another end portion (23) of rubber band material (2) and the two securing plates (25) fixed thereto have been securely anchored to the backward side of seat back (SB). Specifically stated, both securing plates (25) and another end portion (23) of rubber band material (2) are forcibly passed through between the lower end of a back board (5) and the lower end portion (SB-1) of seat back (SB) as well as through between the seat back frame (4) and seat back lower end portion (SB-1). This can easily be done because the seat back (SB) itself has an elastic foam padding (61) covered with a trim cover assembly (62) and is therefore resiliently deformed to allow the above-described passing of those securing plate (25) and rubber band material end portion (23).

As illustrated, a securing member (41) is fixed to the seat back frame (4) and terminates in an end portion having a through-hole (40a) formed therein.

Then, the securing plates (25) connected with the rubber band material (2) are brought to the end portion of securing member (41), and, as shown in FIG. 3, a hog ring (42) is inserted through the aligned holes (40a) and (25a) respectively of the securing member (41) and securing plates (25), whereby the free end of the rubber band material (2) is securely anchored to the seat back (SB).

It is noted here that, normally, the armrest (AR) is biasingly caused by the elastic drawing force of the rubber band material (2) to rotate about the shaft (10A) in a direction to the recessed storage portion (H).

As seen in FIG. 3, when the armrest (AR) is set in the horizontal use position, the cover cloth (3) extends in an upwardly curved way to conceal a space between the backward end of armrest (AR) and the back board (5), thereby preventing the rubber band material (2) from being viewed from the outside. For that purpose, a whole length of the cover cloth (3) is greater than that of the rubber band material (2).

With the above-described structure, when the armrest (AR) is set in the horizontal use position as in FIG. 3, the contracting or drawing force of the rubber band material (2) is not greater than the weight of the armrest (AR) and does not work to return the armrest (AR) to the recessed storage portion (H), so that the armrest (AR) per se is positively retained in that horizontal use position. Further, under that state, the cover cloth (3) extends above the rubber band material (2), thereby concealing the same.

Figure 4:
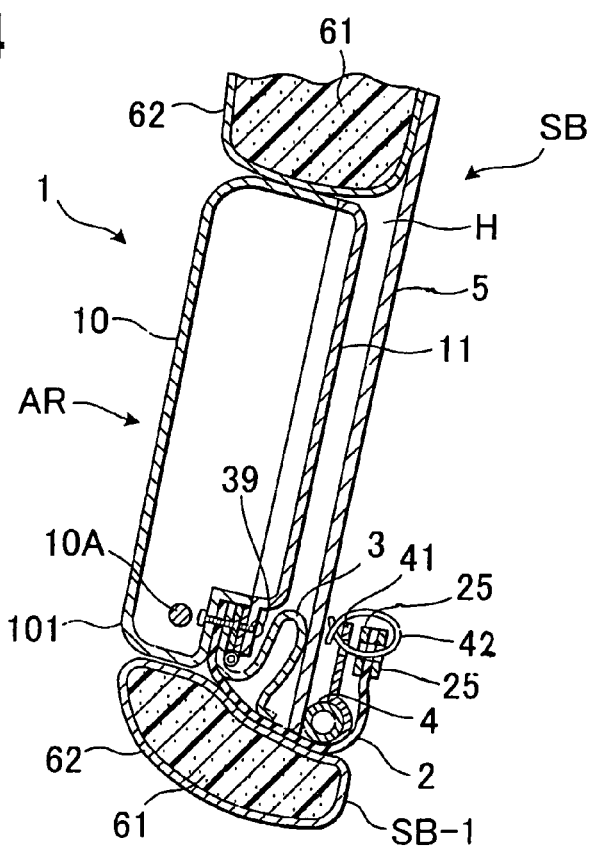
FIG. 4 is a fragmentary sectional view of the principal part of the invention, which shows the state where the armrest is set in a storage portion formed in a seat back.

Conversely, when a user rotates the armrest (AR) upwardly about the shaft (10A) from the horizontal use position, the resilient contacting force of the rubber band element (2) works to accelerate such upward rotation of the armrest (AR), so that the user can easily rotate the armrest (AR) with his or her small force toward the recessed storage portion (H) of seat back (SB). Additionally, as shown in FIG. 4, the armrest (AR) is positively retained in the recessed storage portion (H) under the contracting force of the rubber band element (2), thereby insuring to prevent the armrest (AR) against any undesired accidental element (2), thereby insuring to prevent the armrest (AR) against any undesired accidental movement therefrom.

On the other hand, when the user draws and rotates the armrest (AR) donwardly from the recessed storage portion (H) against the resilient contracting force of rubber band material (2), it follows that the armrest (AR) is automatically rotated donwardly with an accelerated speed due to its own weight and gravity. However, at that time, the rubber band material (2) is resiliently extended with such downward rotation of armrest (AR), increasing its contacting force, which effectively works to suppress such accelerated downward rotation of armrest (AR). Therefore, the armrest (AR) is moderately rotated down to the horizontal use position as in FIG. 3, thereby preventing abrupt downward rotation of the armrest (AR) which is found in the prior art.

Moreover, the structure (1) of the present invention is quite simple and thus inexpensive costwise.

While having the present invention as above, it should be understood that the invention is not limited to the illustrated embodiment, but any other modification, replacement and addition may be applied thereto without departing from the scopes of the appended claims.

What is claimed is:

1. An armrest arrangement in a seat back, wherein said seat back has one side adapted to support a passenger's upper body portion and another side opposite to said one side, comprising:
- a recessed storage portion formed in said one side of said seat back, said recessed storage portion being adapted for allowing said armrest to be stored therein;
- an armrest rotatably mounted at a base end portion thereof in said recessed storage portion so as to be rotatively replaceable between a storage position where the armrest is stored in the recessed storage portion when in no use and a use position where the armrest is located away from said recessed storage position for use purpose;
- an elastic means for resiliently biasing said armrest in a direction to said storage portion, said elastic means being connected at one end thereof with said base end portion of said armrest and connected at another end thereof with said another side of said seat back; and
- a means for covering said elastic means to thereby prevent the elastic means from being viewed from said storage portion when said armrest is located in said use position, said means being provided in said recessed storage portion and disposed between said base end portion of said armrest and said another side of said seat back so as to overlie said elastic means.

2. The armrest arrangement as claimed in claim 1, wherein said elastic means comprises an elastic contractible/extendible element of a band shape.

3. The armrest arrangement according to claim 2, wherein said elastic contractible/extendible element is a rubber band material.

4. The armrest arrangement according to claim 1, wherein a securing means is provided to said another side of said seat back wherein said armrest is at one base end portion thereof rotatably mounted in said storage portion, wherein said elastic means comprises an elastic contractible/extendible element of a band shape, wherein said elastic contractible/extendible element is connected at one end thereof with said one base portion of said armrest and connected at another end thereof with said securing means.

* * * * *